United States Patent
Kost

Patent Number: 6,047,503
Date of Patent: Apr. 11, 2000

[54] PREMANUFACTURED WALL FRAMES WITH PREINSTALLED HURRICANE STRAPPING

[76] Inventor: Christopher Kost, 4175 SW. Martin Hwy., Palm City, Fla. 34990

[21] Appl. No.: 08/990,239

[22] Filed: Dec. 15, 1997

[51] Int. Cl.[7] .............................. E04B 1/38; E04B 2/70; E04H 9/14

[52] U.S. Cl. .......................... 52/79.9; 52/79.12; 52/92.1; 52/92.2; 52/293.3; 52/481.1; 52/581; 52/656.9; 52/690; 52/696; 52/793.11; 52/712

[58] Field of Search .................................. 52/79.9, 79.12, 52/92.1, 793.11, 690, 696, 656.1, 656.9, 712, 481.1, 581, 293.3, 92.2

[56] References Cited

U.S. PATENT DOCUMENTS

| | | | |
|---|---|---|---|
| 3,225,643 | 12/1965 | Couch | 52/712 X |
| 3,813,832 | 6/1974 | Caplan | 52/581 X |
| 4,068,967 | 1/1978 | Hoodis | 52/656.9 X |
| 4,563,851 | 1/1986 | Long | 52/696 X |
| 4,738,071 | 4/1988 | Ezard | 52/712 X |
| 4,890,437 | 1/1990 | Quaile | 52/690 |
| 5,617,693 | 4/1997 | Hefner | 52/693 |

Primary Examiner—Christopher T. Kent
Attorney, Agent, or Firm—Kevin Redmond

[57] ABSTRACT

A basic wall framing unit typically consisting of a rectangle formed of two vertical and two horizontal two inch by four inch lumber with the verticals being spaced apart by two feet on centers. A plurality of wall framing units can be combined at the building site to provide a wall of any desired length. It is also possible to provide complete, larger and more complex wall framing units with provisions for windows and doors which are preassembled at a fabrication facility and then transported to the building site. A wall that is the complete side of a home can be provided and set in place at one time, greatly reducing the time necessary to fabricate the home. All of the framing units are generally secured together with truss plates to provide a means of rapid construction and to reduce or entirely eliminate the need for the carpenter to install hurricane strapping at the site. The truss plates serve dual functions in that they hold the members of the wall framing unit together and also provide the now required hurricane strapping. Since the truss plates are preinstalled at a fabrication facility, the wall framing units arrive at a building site as ready to install wall framing units or as complete walls. The wall framing units and specially designed connectors combine to eliminate a number of time consuming job for construction carpenters, thereby speeding construction and reducing costs.

3 Claims, 3 Drawing Sheets

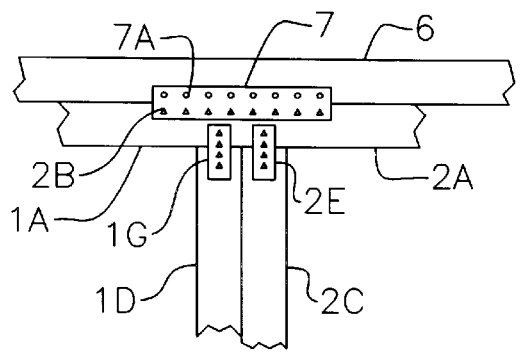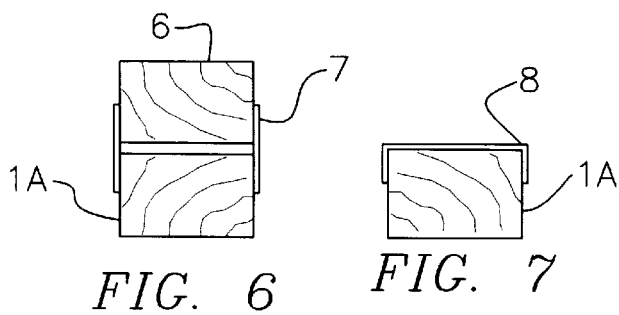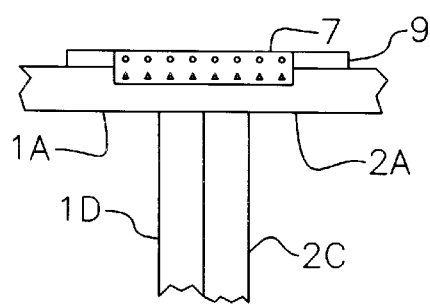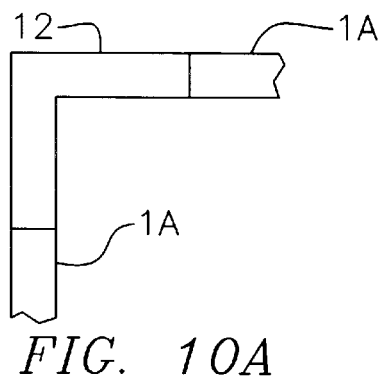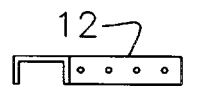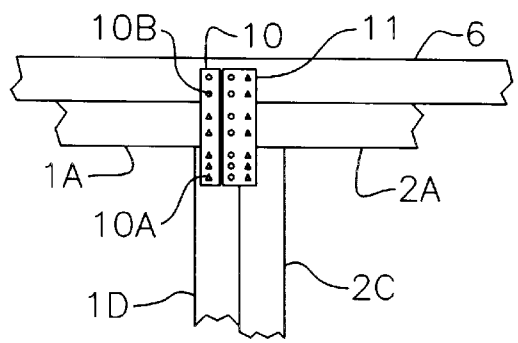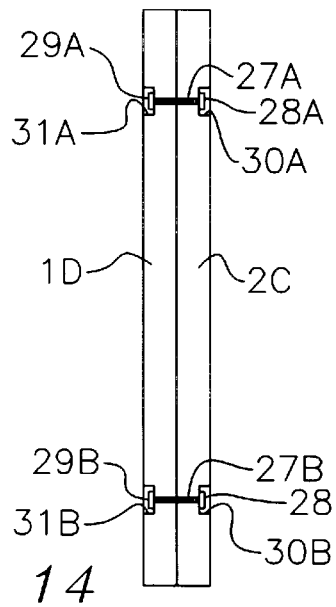

PREMANUFACTURED WALL FRAMES WITH PREINSTALLED HURRICANE STRAPPING

PRIOR ART

Prior art wall framing construction usually was produced at the building site by a carpenter who laid a bottom plate, nailed the vertical studs to the bottom plate and then nailed a top plate to the top of the studs. With hurricane strapping requirements now in place in the building codes in areas of the country where hurricanes are likely, the carpenter must add by hand strapping to the top and bottom of each 2"×4" usually requiring 6 to 8 nails for each strap in addition to those normally required to nail the framing members together. The strapping is an added work load for the carpenter and appreciable slows the work as well as increases the cost.

As illustrated in U.S. Pat. No. 3,813,832, attempts have been made to reduce some of the framing work carried on at the building site. In this prior art patent, wall framing units of various types were prefabricated and shipped to the site for assembly by the construction carpenters. However, there is no reference in this prior art patent to the need for hurricane strapping, nor is there any discussion of the method used to attach the lumber that forms the wall panels. The typical prior art practice used to attach the lumber in the wall panels was to simply nail the lumber together. In addition, the prefabricated wall panels are relatively short. Generally no prior art wall panel with a length equal to the side of an entire building was shown or described.

Although truss construction has long used truss plates, such plates were not generally used in building construction for other than roof trusses or floor trusses. In particular, the technology developed in truss construction had not been transferred to wall construction. This is generally the case today even though hurricane strapping is now required by building codes in many parts of the country. Hurricane strapping is still generally applied in a slow and expensive manner by hand at the site by carpenters and the strapping is generally of the type that consists of narrow strips of metal which do not sufficiently support prefabricated wall framing units during transport to the site. In addition, the wide truss plate type of strapping described in detail below and the method of application of these truss plates, which provide many advantages, has not been generally applied for use in wall framing units.

Recent hurricane experience has shown that the prior art method of assembly, which did not employ hurricane strapping, is totally unsatisfactory. It has resulted in wind damage ranging from roofs being lifted off homes to the total destruction of homes. State building codes and local building departments in areas subject to hurricanes will no longer permit such construction. Hurricane strapping is now a building code requirement for any frame construction in hurricane prone areas and is also required in any type of wall frame system intended for use in such areas.

In addition to the inability to withstand hurricane loads, prior art framing units presented additional problems. The size of prior art framing units was limited by the ability of the frames to retain their form and integrity when transported. An additional problem was encountered in handling large wall frames at the building site. Often there were not enough carpenters available to move large wall frame sections. If the frame was longer than ten feet, its own weight and relative weakness would cause the nails holding the frame together to become dislodged whenever a wall frame this heavy was subjected to tension applied at the top of the frame. This weakness in large prior art wall frames made it difficult to transport such frames. In particular, it would be difficult to connect a crane cable to a top plate to lift a large wall section because the nails would pull out due to the weight of the wall section. In essence, this is the same problem experienced when walls that were nailed together were subjected to the lifting forces of hurricane winds. As will be shown below, in the description of the present invention, the need for hurricane strapping and member securing can be addressed simultaneously to provide an economical solution to new building code requirements. This new system also provides the added strength necessary to make practical the prefabrication and transportation of large wall framing units.

SUMMARY

In the present invention, the lumber used to form the wall framing units, such as two inch by four inch lumber, is precut in a fabrication facility and formed into wall framing units that typically consist in elemental form of two vertical studs on two foot centers with a bottom and top plate. Instead of nailing the two inch by four inch members of the framing unit together, as was done in prior art wall systems, the members are attached by truss plates. The truss plates also serve as the hurricane strapping now required by building codes in all hurricane prone areas. At the building site, the carpenter is merely required to nail the wall framing members in place. The amount of additional strapping required at the site is greatly reduced. Complete large wall frames can be assembled in the fabrication facility and because of the additional strength provided by the truss plates, they can be safely transported over large distanced to a building site. A variety of attachment plates are available separately or preattached to the wall framing units to facilitate connecting the wall framing units together as well as facilitate connecting the wall framing units to over head beams. Building assembly time and labor costs are significantly reduced by employing this new system of wall framing.

BRIEF DESCRIPTION OF THE DRAWINGS

FIG. 5 is a front view of of a portion of two wall framing units showing an "H" connector as it is used to connect two wall framing units together and then to attach the two wall framing units units to a additional overhead plate.

FIG. 6 is a side view of an "H" connector.

FIG. 7 is side view of a "U" connector.

FIG. 8 is a front view of an "H" connector showing a method of protecting this connector during transit.

FIG. 9 is a front view of two framing units showing the way in which a hurricane strap is used to connect two wall units to each other and to a second overhead plate.

FIG. 10A is a plan view of an "L" or corner connector used for joining the top plate of orthogonal walls.

FIG. 10B is a side view of the "L" connector of FIG. 10A.

FIG. 14 is a front elevation view of two adjacent wall framing units connected together by means of recessed bolts.

DETAILED DESCRIPTION OF THE INVENTION

Figure 1:
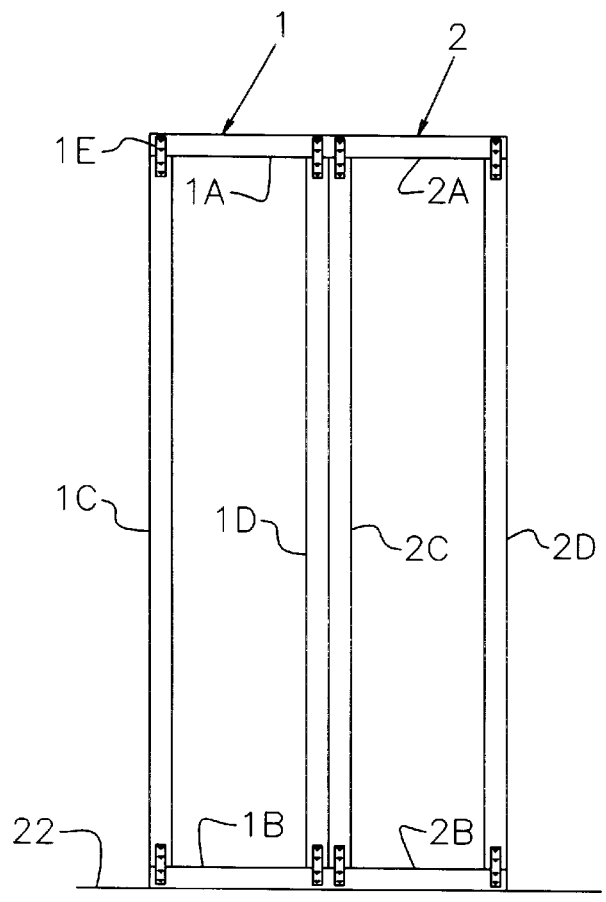
FIG. 1 is a front view of two adjacent wall framing units.

The function and the method of fabrication of the framing units of the present invention are shown in FIGS. 1 through 4. To facilitate the description hereinafter "framing units" will be used interchangeably with "wall frames" and/or "wall framing units". FIG. 1 shows a first framing unit 1 adjacent to a second framing unit 2 in the position they would hold when nailed in place on a floor, such as floor 22, to form a wall at a building site. Framing unit 1 consists of four members 1A, 1B, 1C, and 1D. Members 1C and 1D are the studs or vertical members, while 1B is the bottom plate and 1A is the top plate. Framing unit 2 also consists of four members 2A through 2D with like letters corresponding to like members in framing unit 1.

To produce a wall at a construction site, the framing units are placed on a floor, such as floor 22, in line next to each other as shown in FIG. 1 and then are secured to each other and to the floor. Typically a line is drawn on the floor in the location along which the wall is to be constructed and the bottom plate of each framing unit is aligned with this line before being secured in place. Where hurricane loads are not important, simply nailing the framing units in place is satisfactory. Where hurricane loads are important, the framing units may be secured to the floor and to each other as well as to the structure above using hurricane straps, as the building design and building codes dictate.

Hurricane straps are typically strips of steel sheet metal containing holes to enable the straps to be nailed to the wooden structural members to secure them together with greater strength than can be provided by nails alone. Truss plates are typically plates of sheet steel that contain spikes which are driven into wooden structural members under pressure and like hurricane straps they are used to secure structural members together; however, truss plates have in the past been traditionally reserved for use in truss structures. As will be shown herein, truss plates can be used not only in truss structures, but also in wall framing units to great advantage where they serve to both secure structural members together and as hurricane straps. Because of their application in such dual applications, "truss plates" may be used hereinafter interchangeably with "truss straps".

In the construction of a long wall using short framing units, sufficient short framing units are normally placed adjacent to one another until the desired length of wall is obtained. Where necessary to achieve a specific wall length a framing unit may be cut. The cutting of a framing unit is easily accomplished at the building site and an additional stud is attached to the cut framing unit to close the rectangular outline of the framing unit and make the unit structurally sound. Where large scale production requires the fabrication of a large number of framing units that are of the same length, but are shorter than standard framing unit lengths, a foreshortened framing unit of the desired length can be easily produced at low cost at a fabrication facility.

Figure 11:
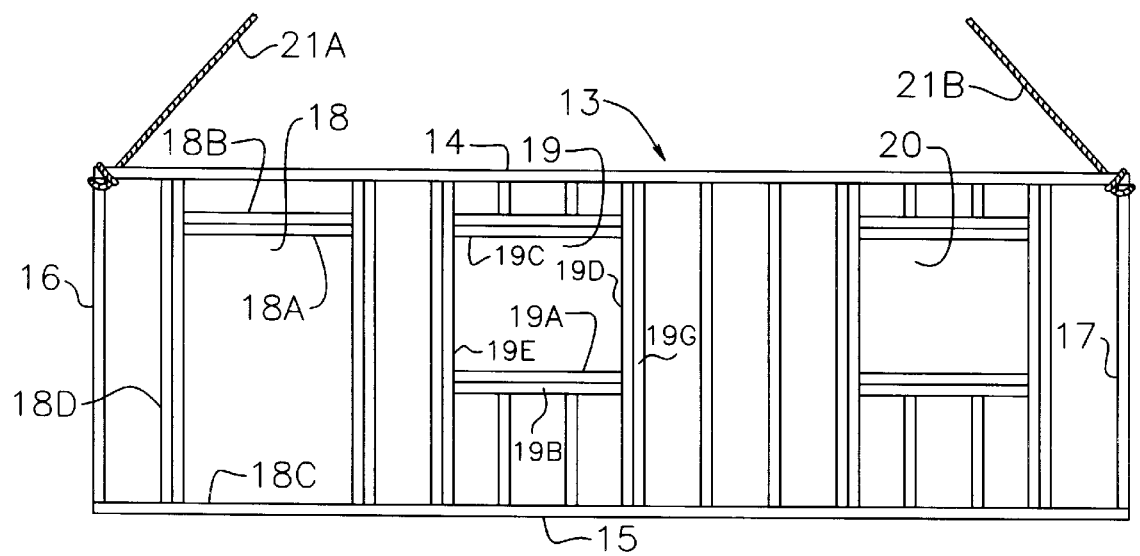
FIG. 11 is a front view a prefabricated wall framing unit that is sufficiently large to provide the complete framing for a side wall of a home with openings to accept windows and a door.
Figure 12:
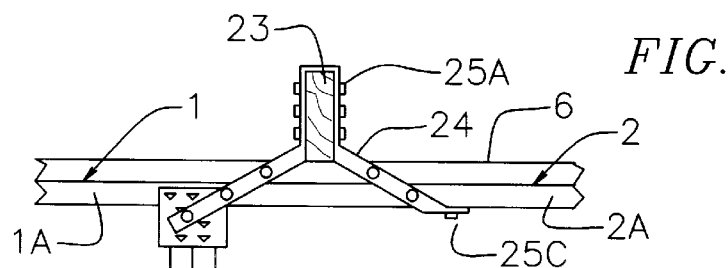
FIG. 12 is a front elevation view of a portion of a wall framing unit supporting an overhead beam and illustrating the method of using strapping to connect the beam to the wall framing unit.
Figure 13:
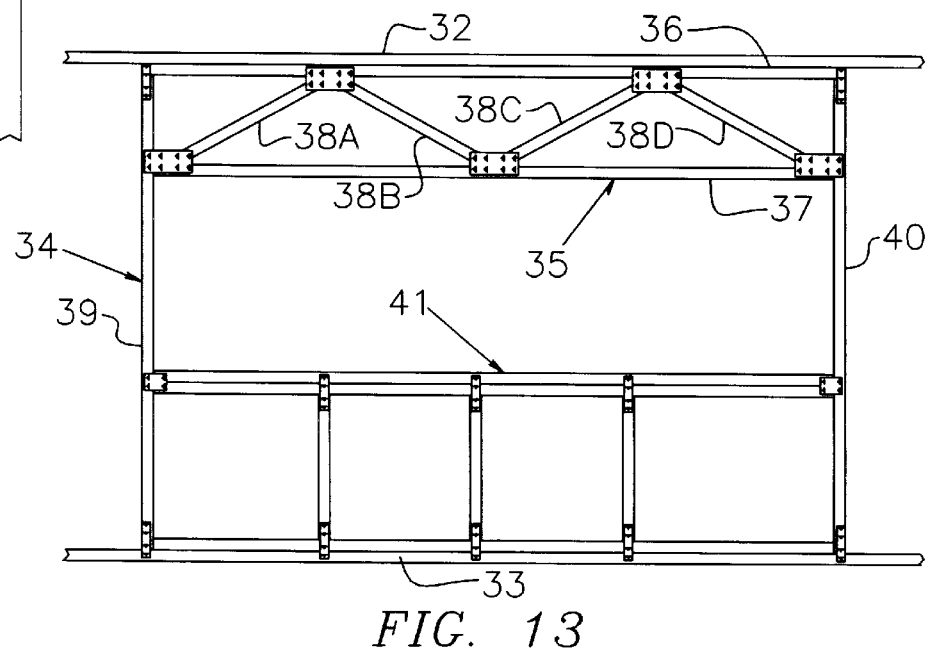
FIG. 13 is a wall framing unit which includes a wide opening for a window, such as a picture window, and a truss structure incorporated into this wall framing unit above the window opening to extend across the top of the window opening and to support the top plate of this framing unit over the span of the window opening.

Openings to accept windows and doors can be added to framing units such as window opening 19 and door opening 18 shown in FIG. 11. In this Figure, a large single framing unit 13 is fabricated as a single piece rather than being fabricated from a series of smaller framing units. However, the way in which window and door opening can be made in framing units, regardless of there size, is shown in this Figure. To provide an opening for a window or door frame in the framing units, the vertical members of the framing unit on either side of the window or door opening are separated sufficiently to accept the desired window or the door frame. Then, for the window opening, a first window cross member, such as 19A which spans the distance between the vertical members, is placed parallel to and at a height above the bottom plate 15 to support the lower portion of the window frame. A second window cross member 19C is placed at a location above the first cross member to accept the window frame and provide a point of attachment to the framing unit for the top of the window frame. The ends of the cross members are secured to the vertical members, such as members 19E and 19D, on either side of the window opening.

If the window is sufficiently wide that the framing unit structure is weakened significantly due to spacing the vertical members apart, the framing unit can be strengthened. This is done by doubling the first window cross member as shown by the addition of cross member 19B which is placed immediately below first cross member 19A to strengthen first window cross member 19A. Similarly the vertical members can also be doubled as necessary. A doubling of the vertical members is shown by vertical member 19G which doubles the vertical member 19D on the right of the window opening 19 in FIG. 11.

For the door frame opening 18, a first door cross member, such as cross member 18A is place parallel to the bottom plate 18C so that it spans the opening and is connected to the vertical members at a height above the bottom plate to accept the door. This cross member is positioned at a location that will enable the top of the door frame to be secured to this cross member. Doubling of cross members and vertical member is used as necessary for strengthening the framing unit about this opening. The portion of the bottom plate under the door 18C is cut away at the site to provide an unobstructed opening for the door frame.

Figure 2:
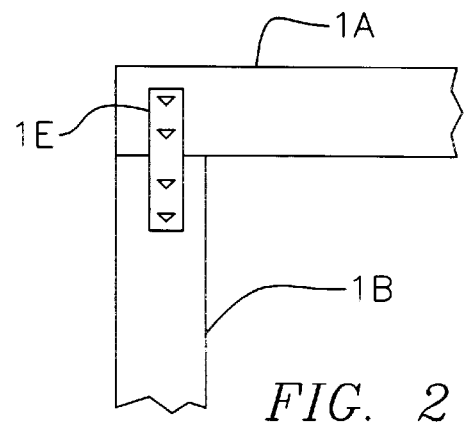
FIG. 2 is a front view of two members of a wall framing unit showing a method of attachment using a truss plate.

FIG. 2 is a detail of a corner of wall framing unit 1 in which members 1A and 1B are attached with truss plate 1E. This plate crosses both members and is pressed into the members under pressure. An identical plate 1F is placed on the reverse side of this wall framing unit directly opposite 1E and is simultaneously pressed into the members between rollers 4 and 5 of a roller press 22 which is shown in cross section in FIG. 4.

Figure 3A:
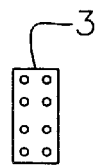
FIG. 3A is a front view of a hurricane strap.
Figure 3B:
FIG. 3B is a side view of the strap shown in FIG. 3A.
Figure 4:
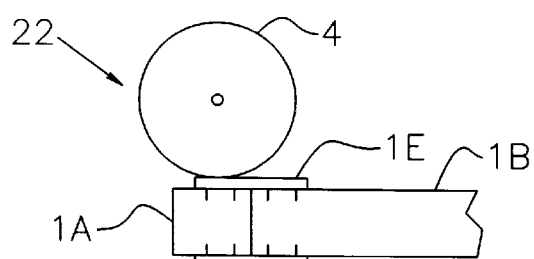
FIG. 4 is a schematic diagram of a roller press used in attaching truss plate to wall framing members.

FIGS. 3A and 3B illustrate a commonly available, standard hurricane strap. This strap is typically a strip of steel with holes to accept nails for nailing the strap to structural members to prevent them from pulling apart under the stress of hurricane winds. These straps are generally placed in the same relative location as truss plate 1D shown in FIG. 2.

Figure 3C:
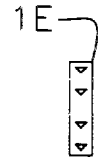
FIG. 3C is a front view of a truss plate.
Figure 3D:
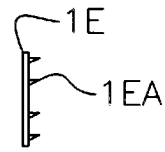
FIG. 3D is a side view of the truss plate shown in FIG. 3C.

FIGS. 3C and 3D illustrate a truss plate that also serves as a hurricane strap. As noted above, a principal difference between typical truss plates and hurricane straps is that the truss plates have spikes while the hurricane straps have holes to accept nails, but there are other differences. The plate shown in FIGS. 3C and 3D differs from a standard hurricane strap in that the openings in truss plates are not punched into the strap in such a way that all the metal in the opening is removed from the strap. Rather, the metal in the punched out area of the truss plate is formed into spikes, such as spike 1EA, which extend orthogonally from the rear face of the plate, as shown in FIG. 3D. These spikes are pressed into the wood in the roller press 22 as noted above, where two opposing rollers 4 and 5 press against the truss plates, such as straps 1E and 1F, located on either side of the members 1A and 1B, to force the spikes on these truss plates into the wooden members of the wall framing unit.

Figure 3E:
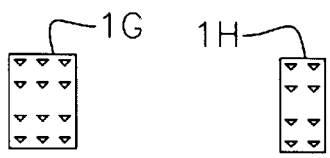
FIG. 3E is a front view of a wide truss plate with three rows of spikes designed to cover two adjacent members.
Figure 3F:
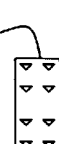
FIG. 3F is front view of a wide truss plate with two rows of spikes designed to cover two adjacent members.
Figure 3G:
FIG. 3G is a side view of the truss strap shown in FIG. 3F.

FIGS. 3F and 3G show the front and side respectively of a a truss plate 1H that is approximately twice the width of strap 1E. FIG. 3E shows a plate 1G that is approximately three times as wide as strap 1E and contains three rows of spikes. Plates 1G and 1H are intended for use where more than one vertical member is to be connected together by a plate and greater strength and rigidity are required in the structure than can be provides by a narrow strap such as strap 1E. These plates are particularly advantageous for use with large framing units such as Frame 13 shown in FIG. 11.

There are several major advantages gained by using truss plates in the assembly of wall units. These include a reduction in the cost of assembly and the time and work associated with installing hurricane strapping at the building side. However, there are additional advantages. The truss straps are installed into the sides of the studs when the wall frame is positioned vertically as shown in FIG. 1. When tension is applied as a lifting force to the top plate 1A and transmitted to a vertical member such as 1C through a strap 1E, the strap takes the entire tensile force. These straps are made from steel which has a tensile strength of 50,000 pounds per square inch or about 5,000 pounds for two straps, located opposite one another on the front and rear of the framing unit and which have a combined cross sectional area of one tenth of an inch. Since typical lifting loads are in the hundreds of pounds, it can be seen that these straps can easily handle such loads. The method of lifting a framing unit by its top plate is illustrated in FIG. 11. Lines 21A and 22A are attached at one end to the top plate 14 of framing unit 13, while the opposite ends of these lines are connected to a crane.

This high lifting strength means that lifting the wall frame by picking up the top plate is now possible, whereas such high lifting strength was absent in heavy prior art wall frames that were held together by nails driven down vertically through the top plate. These nails could simply be pulled out by the tensile force of lifting with the result that prior art wall frame could be pulled apart by the lifting process. On the other hand, the spikes in the truss straps are driven in to the studs in a horizontal direction and therefore do not experience any direct force from lifting which would tend to pull them out of the studs.

If a wide truss strap such as the strap shown in FIG. 3C is used, it has the advantage of preventing rotary movement of the studs in a vertical plane about an axis orthogonal to this plane when a tensile or compressive force is applied between the top and bottom of the wall framing unit. The wide width of the truss strap and the double row of spiked in this plate offer resistance to such motion. In prior art wall frames that were nailed together, rotary motion was possible because applied tensile forces tended to loosen, bend or extracted the nails, giving the structural members freedom to move. These effects on the nails and members occur with relatively little applied force. The added strength against rotary motion provided by the wide strap means that strong tensile and compressive loads experienced during transportation can be withstood without affecting the integrity of the wall frame, thereby making the transport of these new framing units possible even when they are large and heavy.

In the fabrication of wall framing units, standard lengths of lumber required to form the framing unit are cut in quantity. This precut lumber is then arranged to form the framing units. The truss plates are simply laid in place or at most tacked in place on the members using the spikes that are an integral part of the truss straps. The whole framing unit is then passed through the rollers, quickly producing the framing units while at the same time eliminating the need to install up to 40 nails at the building site.

Typically, the wall framing units are fabricated from two inch by four inch lumber. Where this size of lumber is used, there will be two 2"×4" vertical studs positioned immediately adjacent one another, as shown in FIG. 1, but the distance to the next set of two studs is normally two feet, instead of the 16 inches commonly used in on site framing. This spacing of double studs causes the amount of lumber and the strength to be similar for either type of wall, but the time to produce a wall framing unit is greatly reduced as compared to framing and strapping on the site by a carpenter, as is presently done.

Larger wall framing units, such as framing unit 13 shown in FIG. 11, are possible using the method of securing members together described above. In such framing units, multiple studs are used and the spacing between studs is generally 16 inches on center. Only at the end of one framing unit where it joins another framing unit or about windows and doors are the studs doubled as shown in FIG. 1. As noted earlier, a way to join framing units and obtain special lengths is to cut the standard wall frame at one or both ends. This may be done by cutting the top and bottom plate, such as 2A and 2B in FIG. 1 for example, and then joining the cut ends of these plates to plate 1A and 1B. This procedure avoids doubling at the juncture of the framing units and provides a custom length as well.

Connection between framing units and walls can be made with a variety of connector plates which provide the advantages of hurricane strapping and the strength of truss plates. Connectors which can be used for this purpose are shown in FIGS. 5 through 10. These connectors are typically fabricated from steel sheet metal which is galvanized. FIG. 5 shows the side view of a first connector 7 referred to as an "H" connector. FIG. 6 shows a cross sectional view of the "H" connector. This connector is referred to as an "H" connector because its cross section, as shown in FIG. 6, resembles the letter "H". The "H" connector is used to join two wall framing units together as shown in FIG. 5. In this Figure, the two wall framing units are the same as those shown in FIG. 1 and like drawing numbers refer to like elements. Hurricane truss straps 1G and 2E are used to connect members 1D to 1A and 2C to 2A respectively in a manner similar to that in which strap 1E was used to connect members 1C to 1A in FIG. 1. The "H" connector 7 is dropped in place over the top plates 1A and 2A of the two wall framing units to be joined. A third top plate 6 which bridges the junction of the two wall sections is dropped into place in the top portion of the "H" connector. The relative positions of top plates 1A and 6 within this connector are shown in FIG. 6. To enable the bottom channel of the "H" connector to fit over a top plate, its sides are temporarily spread apart, enabling the spikes to pass by the top plate and into position before the framing unit is passed into the roller press.

The "H" connector can be used to attach plates 1A and 2A together at the wall framing fabrication facility by means of truss spikes located in the "H" connector 7 at the bottom row of holes 7B. This connector can then be attached to the third or additional top plate 6 at the building site by nails placed through the top row of holes 7A. This use of connector 7 enables the fabrication facility to attach two or more small standard wall framing units together to produce a larger wall framing unit. The "H" connector holds the wall framing units together and has provision for attachment to a third top plate at the building site, which enables this connector to also serve as a hurricane strap by connecting the wall framing units to the building frame at the next level above.

As can be seen from FIG. 5, it is necessary to temporarily tack a piece of scrap lumber 9 into the top portion of this connector in order to transport a framing unit using connector 7 without damaging this connector. The scrap lumber 9 prevents the connector from being bent when placed in contact with a truck bed or with other wall framing units which could occur during transport of these wall framing units. At the building site, the scrap lumber 9 is simply pried out and discarded, freeing the upper channel of this connector for acceptance of an additional or third top plate.

In building construction in which a third top plate is not desired, wall framing units can be connected by using the "U" connector 8 shown in cross section in FIG. 7. The "U" connector contains a "U" shaped channel designed to cover and be engaged with a wall framing unit. This simpler type of connector is similar to an "H" connector, but only includes the lower half of the "H". Although not shown, this connector contains either holes or truss spikes for attachment to the top plates in a wall frame in a similar location to those in the lower half of the "H" connector. It can be used in the same way as the "H" connector to connect adjacent wall framing units together, but it does not have the ability to act as a hurricane strap to the above building structure at the same time. Nevertheless, it is useful where there is no third top plate and also, when inverted, it is useful for connecting the bottom plate of wall frame sections together.

A modification of the "U" connector is shown in FIGS. 10A and 10B. This connector, designated by drawing numeral 12, is referred to as the "L" connector because in the plan view of FIG. 10A it resembles the letter "L". In the side view of FIG. 10B, it can be seen to resemble the cross section of the "U" connector of FIG. 7, only the "U" shaped channel is continued around a corner. This features aids in connecting adjacent orthogonal walls. To those skilled in the art, it is clear that many variations of the basic "U", "H" and "L" connectors are possible and accordingly are considered within the scope of the present invention. For example, a connector which has a plan view in the shape of a "T", but a cross section of a "U" connector can be used to connect a first wall framing unit orthogonally joining the midsection of a second wall framing unit, or an "X" connector can be used for connecting a first and a second wall, when the first wall continues past the midsection of the second wall, The "L" connector described above can be modified to have an upper channel like an "H" channel to accept an additional over head plate at the juncture of two walls.

FIGS. 9 shows two modifications of the flat truss plates shown in FIGS. 3C and 3F used on a portion of the junction of the two wall framing sections shown in FIG. 1. This Figure also includes a third top plate 6 as was shown in FIG. 5; however, in FIG. 9, the "H" connector and hurricane straps 1G and 2E are not used. Instead, straps 10 and 11 are used. Strap 10 is simply a long thin version of strap 1E shown in FIG. 3C. It extends across structural members 1D, 1A and 6. As can be seen in FIG. 9, the lower portion employs truss straps spikes symbolized by triangular openings such as opening 10A located in the lower portion of the strap. The upper portion of this strap utilizes holes, symbolized by circular openings such as opening 10B. The lower portion of this strap is connected to members 1A and 1D in the fabrication facility while the upper portion is attached to the third plate 6 by means of nails through the holes at the construction site. The principal feature that this strap has over that of strap 1E is that it is longer and permits on site connection to the next higher level of structure, which may be required at specific locations in a building by the hurricane construction codes.

Strap 11 shown in FIG. 9 is a longer version of strap 1H. As can be seen in this Figure, strap 11 has been designed to be used for attaching vertical members such as 1D and 2C together and then attaching these vertical members to top plates 1A and 2A. Strap 11 also makes connection with a third or additional top plate 10 which is located immediately above top plates 1A and 2A. This strap is shown to have spikes on one side and holes on the other to permit it to be installed on one side to the framing unit 2 during manufacture and then attached by a carpenter at the building site to the adjacent framing unit 1. It is possible to have such a strap contain all holes or all spikes for use either entirely at the site or entirely at the fabrication plant.

Trusses used to frame roofs can range up to 60 feet long and even longer in some cases. The truss plates used to secure the truss members together makes the truss rigid at the joints where these plates are installed, thereby holding the truss members in the same position as they were initially installed in the fabrication facility. Rather than using relatively narrow truss straps to connect the member of the truss together, wide area truss plates, such as the one shown in FIG. 3E, are used. The wide area truss plate can be almost as wide as the lumber used to build the truss. For example where 2"×4" lumber is used, the truss plate can be 3 inches wide. The purpose in using the wide area plate is to securely grip both members that are to be joined by spikes in the truss plate and add strength to the joint. As a result of the increased joint strength provided by these wide area truss plates, the trusses retain their shape and structural integrity even though they are often hoisted up several times by a crane before they come to rest in a building. Typically, they are first hoisted up at the fabrication facility and loaded onto a flat bed truck. The truck often transport the trusses many miles to the building site where the trusses are again hoisted up to unload them from the truck. They are hoisted up once again at the building site for installation on building. Over many years of experience, it has been found that the trusses, despite their large size, can withstand this type of handling, whereas standard wall frames would have difficulty in maintaining their structural integrity and form.

This very positive experience with the handling and installation of roof trusses makes possible one of the greatest advantages of wall framing units using truss type plates as hurricane strapping. Wall framing units that constitute either large portions of a wall or the entire walls of a building are fabricated using truss plates as hurricane strapping and are transported to the site in the same way as roof trusses are currently transported. The same crane used in prior art construction to hoist the roof trusses up to their position on top of a building is again used to hoist the large scale wall framing unit in place. Buildings that previously took days to frame are now framed in less than one day. A large wall framing unit of this type 13 is shown in FIG. 1. As noted earlier, this wall framing unit is a complete wall with openings 19 and 20 to accept window frames and an opening 18 to accept a door frame. In FIG. 11, the wall framing unit 13 is shown, to comprise a top plate 14, a bottom plate 15 and a plurality of vertical members such as members 16 and 17. Cross members such as 19A and 19C, described previously, are used to frame the bottom and top of a window opening such as window opening 19.

To insure meeting local codes, an engineering analysis is generally necessary for a particular design to be sure the correct number and size of hurricane straps and/or truss plates are employed in the correct locations. Fortunately, this service is usually conveniently available to the builder through the framing unit manufacturer or the building's architect, thereby making it a relatively simple matter for the builder to insure that the building will meet local code requirements using the framing units described.

What is claimed is:

1. A building wall mounted on a building floor and designed to withstand hurricane loads, said building wall comprising:

(a) a plurality of framing units with each of said framing units including its own respective top plate, bottom plate and first and second vertical members, said top and bottom plate and first and second vertical members of each of said framing units having a longitudinal axis and a first and a second end and for the plurality of framing units the top and bottom plates are generally of the same length and said vertical members are generally of the same length, and for each framing unit said first vertical member is placed between and adjacent to said top and bottom plates at the first end of said plates and said second vertical member is placed between and adjacent to said top and bottom plates at the second end of said plates, said vertical members being oriented with their longitudinal axes generally orthogonal to the longitudinal axes of said top and bottom plates and said top and bottom plates being attached to said vertical members by means of truss plates which have spikes pressed into said vertical members and into the top and bottom plates to secure said top and bottom plates and said vertical members to each other where they are positioned adjacent one another for rigidity and tensile strength to withstand hurricane loads, each of said framing units positioned to have its bottom plate on said building floor and oriented with its vertical members held vertically, each framing unit being located next to another on a line on said building floor along which said building wall is to be located with a vertical member on one wall framing unit being located immediately adjacent a vertical member of the next adjacent wall framing unit, and (a) means for attaching each framing unit to said building floor, and (b) means for attaching each of said framing units to an adjacent framing unit to form said wall said means for attaching each framing unit to an adjacent framing unit includes an additional top plate placed over the top plates of at least two adjacent framing units and said building wall further comprises means for attaching said additional top plate to said two adjacent framing units to strengthen the wall at the juncture of the two adjacent framing units.

2. A building wall as claimed in claim 1 wherein said means of attaching said additional top plate to the two adjacent framing units includes an "H" connector placed between said additional top plate and the top plates of at least two adjacent framing units, said "H" connector being secured to both said additional top plate and to said top plate of said two adjacent framing units to aid in the support of said two adjacent framing units at their juncture.

3. A building wall mounted on a building floor and designed to withstand hurricane loads, said building wall comprising:

(a) a plurality of framing units with each of said framing units including its own respective top plate, bottom plate and first and second vertical members, said top and bottom plates and first and second vertical members of each of said framing units having a longitudinal axis and a first and second end and for the plurality of the framing unit the top and bottom plates are generally of the same length and said vertical members generally of the same length, and for each framing unit said first vertical member is placed between and adjacent to said top bottom plates at the first end of said plates and said second vertical member is placed between and adjacent to said top and bottom plates at the second ends of said plates, said vertical members being oriented with their longitudinal axes generally orthogonal to the longitudinal axes of said top and bottom plates, and said top and bottom plates being attached to said vertical members by means of truss plates which have spikes pressed into said vertical members and into said top and bottom plates to secure said top and bottom plates and said vertical members to each other where they are positioned adjacent one another for rigidity and tensile strength, each of said framing members being positioned to have its bottom plate on said building floor and oriented with its vertical members held vertically, each framing unit being located next to another wall framing unit on a line on said building floor along which said building wall is to be located with a vertical member of one framing unit being located immediately adjacent a vertical member of the next adjacent wall framing unit, and (b) means for attaching each of said wall framing units to said building floor, (c) means for attaching each of said framing units to an adjacent framing unit to form said wall, (d) an additional framing unit generally similar to said plurality of framing units and located with its bottom plate on said building floor and said bottom plate of said additional framing unit being oriented orthogonal to said line along which said building wall is to be located with the longitudinal axis of its vertical members oriented vertically and with one of its vertical member positioned adjacent one end of said building wall to form a corner at the end of said building wall, and (e) an "L" connector placed over and secured to the top plate of said additional framing unit and said building wall at their juncture to add support to said juncture.

* * * * *